United States Patent
Phillips et al.

(10) Patent No.: US 10,475,262 B2
(45) Date of Patent: Nov. 12, 2019

(54) PROVIDING VIRTUAL AND PHYSICAL ACCESS TO SECURE STORAGE CONTAINER

(71) Applicant: Capital One Services, LLC, McLean, VA (US)

(72) Inventors: Jeremy Phillips, Brooklyn, NY (US); Hannah Volfson, New York, NY (US); Zhe Liu, McLean, VA (US); Edward Abbott, Wilmington, DE (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/176,108

(22) Filed: Oct. 31, 2018

(65) Prior Publication Data
US 2019/0304219 A1    Oct. 3, 2019

Related U.S. Application Data

(62) Division of application No. 15/940,389, filed on Mar. 29, 2018, now Pat. No. 10,147,251.

(51) Int. Cl.
| | |
|---|---|
| *G06F 21/31* | (2013.01) |
| *G07C 9/00* | (2006.01) |
| *H04N 7/18* | (2006.01) |

(52) U.S. Cl.
CPC ......... *G07C 9/00158* (2013.01); *G06F 21/31* (2013.01); *G07C 9/00912* (2013.01); *H04N 7/183* (2013.01)

(58) Field of Classification Search
CPC ............ G06Q 10/083; G06Q 10/0832; G06Q 10/0836; B65G 1/1371
See application file for complete search history.

(56) References Cited

U.S. PATENT DOCUMENTS

| | | |
|---|---|---|
| 6,129,029 A | 10/2000 | Watson |
| 7,441,277 B2 | 10/2008 | Burges et al. |

(Continued)

FOREIGN PATENT DOCUMENTS

JP    2007023668    2/2007

OTHER PUBLICATIONS

Beth Healy, "Fidelity rolls out a free virtual safe deposit box", https://www.bostonglobe.com/business/2016/05/25/fidelity-freebie-safe-deposit-boxcloud/yE0TmnSBppuRvjXMXDUNZJ/story.html, May 25, 2018, 2 pages.

(Continued)

*Primary Examiner* — Nabil H Syed
(74) *Attorney, Agent, or Firm* — Harrity & Harrity, LLP

(57) ABSTRACT

A device may obtain a first image depicting contents included in a secure storage container at a first point in time and first user account data associated with the secure storage container. The device may store the first image in a data structure associated with the first user account data. In addition, the device may receive data indicating that an individual associated with a second user account accessed the secure storage container, and receive a second image depicting contents included in the secure storage container at a second point in time. The second image may be stored in the data structure. The device may further receive, from a user device associated with the first user account data, a request to access the data structure, and the device may provide, to the user device, data that causes display of the second image.

20 Claims, 7 Drawing Sheets

(56) References Cited

U.S. PATENT DOCUMENTS

| | | | |
|---|---|---|---|
| 7,689,465 B1* | 3/2010 | Shakes | G06Q 10/08 |
| | | | 705/27.1 |
| 10,049,236 B1 | 8/2018 | Alkarmi et al. | |
| 2006/0181392 A1 | 8/2006 | Watson | |
| 2007/0256615 A1 | 11/2007 | Delgrosso et al. | |
| 2008/0033847 A1 | 2/2008 | McIntosh | |
| 2013/0317986 A1 | 11/2013 | Tucker | |
| 2016/0058181 A1 | 3/2016 | Han | |
| 2017/0301200 A1 | 10/2017 | Siminoff | |
| 2018/0012176 A1* | 1/2018 | McHale | G06Q 10/0832 |
| 2018/0108195 A1 | 4/2018 | Bashkin et al. | |
| 2018/0130017 A1* | 5/2018 | Gupte | G06Q 10/0836 |
| 2018/0341909 A1* | 11/2018 | Stuckman | G01S 1/02 |

OTHER PUBLICATIONS

Co-pending U.S. Appl. No. 15/940,389, filed Mar. 29, 2018, entitled "Providing Virtual and Physical Access to Secure Storage Container", by Jeremy Phillips et al., 51 pages.
Co-pending U.S. Appl. No. 16/176,085, filed Oct. 31, 2018.

\* cited by examiner

PROVIDING VIRTUAL AND PHYSICAL ACCESS TO SECURE STORAGE CONTAINER

RELATED APPLICATION

This application is a divisional of U.S. patent application Ser. No. 15/940,389, filed Mar. 29, 2018, which is incorporated herein by reference.

BACKGROUND

Secure storage containers, such as safe deposit boxes, enable entities (e.g., individuals, organizations, and/or the like) to store physical objects in a manner designed to secure the objects from a variety of potential risks, such as loss, damage, theft, and/or the like.

SUMMARY

According to some implementations, a method may comprise: obtaining, by a device, an image depicting contents included in a secure storage container; obtaining, by the device, data identifying a first user account associated with the secure storage container; storing, by the device, the image in a data structure associated with the first user account; receiving, by the device and from a first user device associated with the first user account, access control data, the access control data indicating that access to the data structure is permitted for requests associated with a second user account; receiving, by the device and from a second user device associated with the second user account, a request to access the data structure; and providing, by the device and to the second user device, data that causes display of the image.

According to some implementations, a device may comprise: one or more memories; and one or more processors, communicatively coupled to the one or more memories, configured to: obtain a first image depicting contents included in a secure storage container at a first point in time; obtain first user account data associated with the secure storage container, the first user account data identifying an owner of the secure storage container; store the first image in a data structure associated with the first user account data; receive data indicating that an individual associated with a second user account accessed the secure storage container, the individual being different from the owner; receive a second image depicting contents included in the secure storage container at a second point in time; store the second image in the data structure associated with the first user account data; receive, from a user device associated with the first user account data, a request to access the data structure; and provide, to the user device, data that causes display of the second image.

According to some possible implementations, a non-transitory computer-readable medium may store instructions, the instructions comprising: one or more instructions that, when executed by one or more processors, cause the one or more processors to: receive a request for delivery of an object included in a secure storage container, the request being associated with a user account associated with a user; identify a courier capable of delivering the object to the user; obtain a first image depicting contents included in the secure storage container, the first image being captured based on the courier obtaining the object from the secure storage container; obtain a second image depicting delivery of the object to the user; store the first image in a data structure associated with the user account; and store the second image in the data structure.

DETAILED DESCRIPTION

Figure 1A:
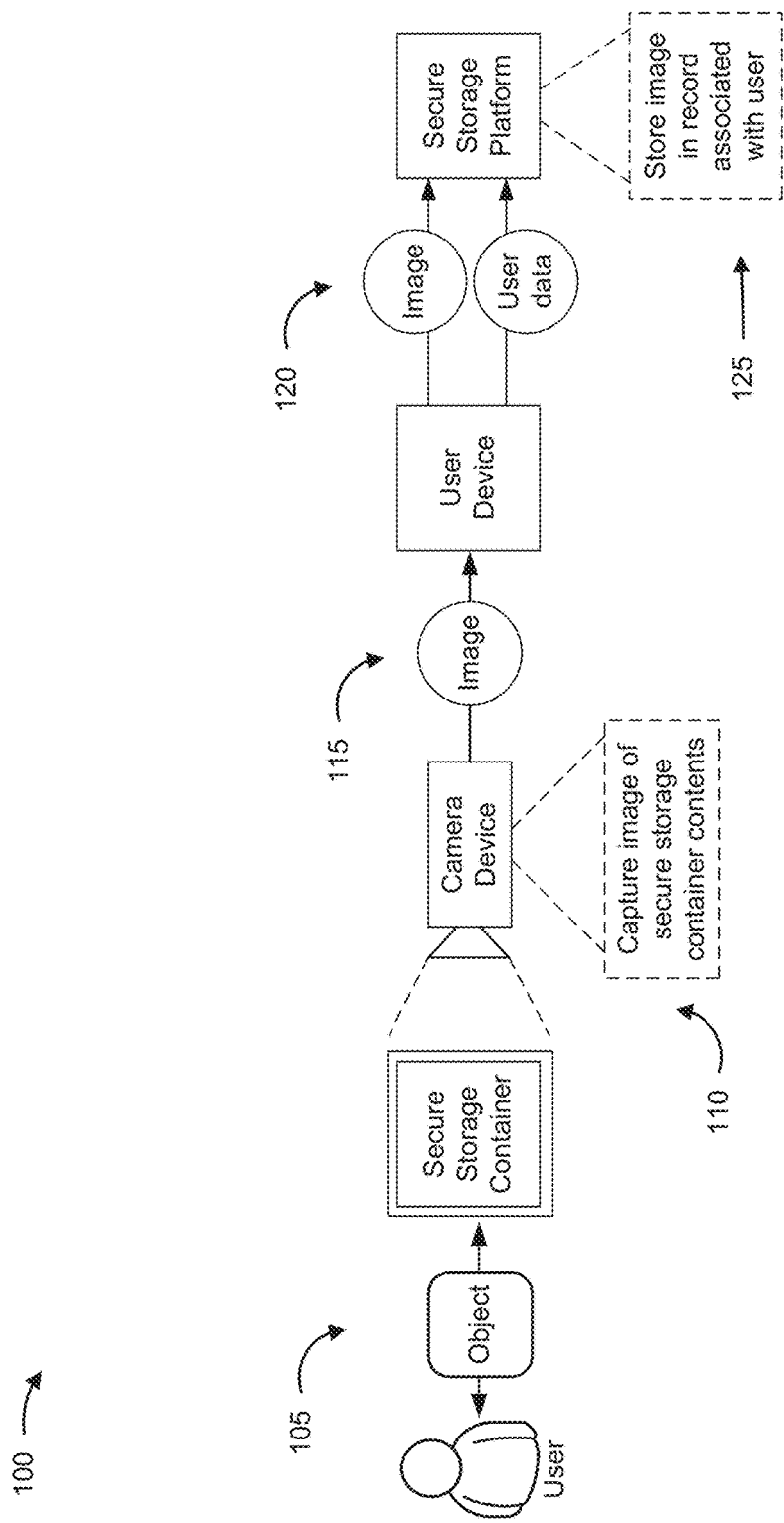
FIGS. 1A-1C are diagrams of overviews of example implementations described herein.

The following detailed description of example implementations refers to the accompanying drawings. The same reference numbers in different drawings may identify the same or similar elements.

People often use secure storage containers, such as safety deposit boxes, to store valuable items, e.g., to protect them from loss, damage, and/or the like. While secure storage containers often provide effective protection, physical access may be inconvenient, often requiring a person to physically travel to a secure location, such as a bank vault, to access the secure storage container. In addition, records regarding the contents of secure storage containers may not exist and/or be difficult to access.

Some implementations, described herein, provide a secure storage platform that provides physical and virtual access to secure storage containers, using network accessible images and other information to keep a record of the contents added to and/or removed from secure storage containers, and using couriers to provide physical access to secure storage containers for remote users. For example, the secure storage platform may store, in a data structure, images of the contents of a secure storage container (e.g., images of the insides of a bank safe deposit box). The secure storage platform may obtain an image each time the secure storage container is accessed, and storing the images enables the secure storage platform to provide users with access to a record of the contents included in the secure storage container (e.g., including access to the images). The secure storage platform may also store, and provide users access to, other information regarding a secure storage container, including information identifying objects added to and/or removed from the secure storage container, timestamps associated with secure storage container access (e.g., physical and/or virtual), and user data associated with users that accessed the secure storage container. The secure storage platform may also enable a user to permit access (e.g., physical and/or virtual) to the secure storage container by other users.

In some implementations, the secure storage platform may enable physical delivery of an object included in a secure storage container and/or delivery of the entire storage container. This may enable a remote user to physically access the contents of the secure storage container, including enabling the remote user to add and/or remove objects to the secure storage container. For example, the secure storage platform may receive a request for delivery of an object included in a secure storage container. After identifying a courier (e.g., a human courier, a land-based autonomous vehicle, an unmanned aerial vehicle (UAV) courier, a robotic courier, and/or the like) capable of delivering the object, the secure storage platform may provide the courier with delivery data enabling the courier to obtain the object from the secure storage container and deliver the object to a user associated with the request. In this situation, the secure storage platform may obtain images to be included in a data structure associated with the secure storage container, such as an image depicting the contents of the secure storage container when the courier obtained the object from the secure storage container, and an image depicting delivery of the object to the user associated with the request.

In this way, the secure storage platform enables physical and/or virtual access to a secure storage container, providing a remote user with the ability to add or remove objects from the secure storage container without traveling to a physical location where the secure storage container may typically be stored (e.g., a bank vault). In some situations, this may provide users with access to their secure storage containers in situations where access might otherwise be difficult, or impracticable. In addition, the secure storage platform enables a user to allow other users to access (physically and/or virtually) a secure storage container associated with the user, allowing the user to share access to the secure storage container (e.g., as defined by access controls set by the user). Furthermore, by using a data structure to store information regarding secure storage container access, the secure storage platform may provide an enhanced user experience for a user, enabling a user to view images of the contents of the secure storage container, and other information regarding secure storage container access, at various points in time and/or associated with various events, such as the removal or addition of an object.

FIG. 1A is a diagram of an overview of an example implementation 100 described herein. As shown in FIG. 1A, example implementation 100 includes a secure storage container (e.g., a bank safe deposit box or other container for storing physical objects), a camera device (e.g., a device capable of capturing a digital image of the secure storage container and the contents of the secure storage container), a user device (e.g., a mobile phone, wearable device, tablet computer, personal computer, and/or the like), and a secure storage platform (e.g., a cloud computing platform, server device, and/or the like). Example implementation 100 also includes a user, which may be an entity associated with the secure storage container (e.g., an individual renting access to the secure storage container) and/or associated with the user device (e.g., an owner/operator of the user device).

As shown by reference number 105, the user adds an object to the secure storage container and/or removes an object from the secure storage container. The addition and/or removal of the object may occur regardless of the physical location of the secure storage container. For example, the user may obtain the object from the secure storage container while the user visits a bank. As another example, the user may add the object to the secure storage container when a courier delivers the secure storage container to the user.

As shown by reference number 110, the camera device captures an image of the secure storage container contents. For example, the camera device may capture an image of the object being added/removed from the secure storage container. In some implementations, the camera device may be a stand-alone camera device (e.g., a security camera installed at a bank). In some implementations, the camera device may be included in another device, such as the user device, or a courier device associated with a courier. In some implementations, the camera device is included in the secure storage container (e.g., located inside of the secure storage container, enabling image capture to occur based on the secure storage container being opened and/or closed, based on detecting motion, and/or the like). In some implementations, as noted above, the camera device may capture the image automatically (e.g., based on motion detection and/or based on timing). Additionally, or alternatively, the camera device may be manually activated (e.g., by the user, an employee associated with an organization providing secure storage container services, a courier, and/or the like). While various devices throughout FIGS. 1A-1C make use of images captured by the camera device, in some implementations, the camera device may capture (and other devices may make use of) audio and/or video data. In some implementations, capturing the image may include other forms of digital capturing of information, such as matrix bar code capturing, bar code reading, optical character recognition capturing, and/or the like, which may be used to identify contents of the secure storage container.

As shown by reference number 115, the camera device provides the image of the secure storage container contents to the user device. In an implementation where the camera device is included in the user device, the transfer of the image may occur internal to the user device (e.g., via an application operating on the user device, using a memory device, using a communications interface, and/or the like). In some implementations, the camera device and the user device are physically separate devices, and the camera device may provide the image to the user device, for example, via a wired and/or wireless network. Providing the image to the user device may enable the user device (e.g., via an application operating on the user device) to perform a variety of actions, such as displaying the image for the user, storing the image, uploading the image to the secure storage platform, and/or associating the image with information relevant to the image. Information relevant to the image may include, for example, data identifying objects included in the image, data identifying a time at which the image was captured by the camera device and/or received by the user device, data identifying the user, and/or the like.

As shown by reference number 120, the user device provides the secure storage platform with the image and user data. The image may include the image captured by the camera device. The user data may include a variety of information associated with the user. For example, the user data may include a user account identifier that identifies a user account associated with the secure storage container, user input regarding the addition or removal of the object from the secure storage container, data identifying the object that was added or removed, and/or the like. Providing the secure storage platform with user data may enable the secure storage platform to provide a variety of features and functionality, described in further detail, below.

In some implementations, the user data may include access control data. The access control data may indicate which entities may have physical and/or virtual access to the secure storage container. For example, the user may wish to authorize at least one other user for virtual access to the secure storage container associated with the user, e.g., to enable the other users to access online records, images, and/or the like, which are stored or otherwise managed by the secure storage platform. As another example, the user may wish to authorize at least one other user for physical access to the secure storage container, e.g., to enable the other users to physically access the secure storage container. The access control data may identify other users in a variety of ways, including personal information (e.g., name, address, telephone number, biometric identity data, and/or the like), user account information (e.g., user account identifier), and/or the like.

As shown by reference number 125, the secure storage platform stores the image received from the user device in a record associated with the user (e.g., a data structure associated with the user's user account, the secure storage container, and/or the like). The image may be stored by the secure storage platform along with additional information relevant to the secure storage container (e.g., information included in the user data). By way of example, the secure storage platform may manage a data structure, such a database, which includes information related to the secure storage container. The information related to the secure storage container may include a variety of information, such as data identifying the secure storage container (e.g., an identifier), data identifying the contents of the secure storage container (e.g., a list of objects included in the secure storage container), a user in control of the secure storage container (e.g., the user), other users authorized for physical and/or virtual access to the secure storage container (e.g., based on access control data provided by the user), time stamped records indicating when the secure storage container was accessed, data identifying the object that was added or removed when the secure storage container was accessed, images of the secure storage container contents, data identifying which user accessed the secure storage container, data identifying a courier that delivered an object and/or the secure storage container, and/or the like.

In some implementations, the secure storage platform may perform, or cause to be performed, one or more computer vision techniques, e.g., in a manner designed to enable identification of an object included in the secure storage container. For example, the secure storage platform may use object recognition (e.g., edge detection, greyscale matching, gradient matching, scale invariant feature transform, speeded up robust features, and/or the like) to identify an object, and the data identifying the object may be stored in the record associated with the user. In some implementations, user feedback may be used to facilitate object identification. For example, the secure storage platform may identify an object using an object recognition technique and provide the result(s) to the user, enabling the user to confirm or correct the identification of the object. In some implementations, the secure storage platform may use computer vision techniques to determine whether the image is sufficient to identify an object (e.g., whether the image is too dark, too light, too blurry, and/or the like) and, in a situation where the image is not sufficient, the secure storage platform may cause an additional image or images to be captured, e.g., in a manner designed to obtain and store a relatively high quality image of the contents of the secure storage container.

In this way, the secure storage platform is able to obtain and store information relevant to access to the secure storage container. The ability to store information relevant to the secure storage container enables the secure storage platform to provide users with a variety of information regarding the secure storage container. For example, storing records enables the secure storage platform (e.g., via a web interface, application data, and/or the like) to provide the user (and/or other authorized users) with images of the secure storage container contents, records of access to the secure storage container, and/or the like.

Figure 1B:
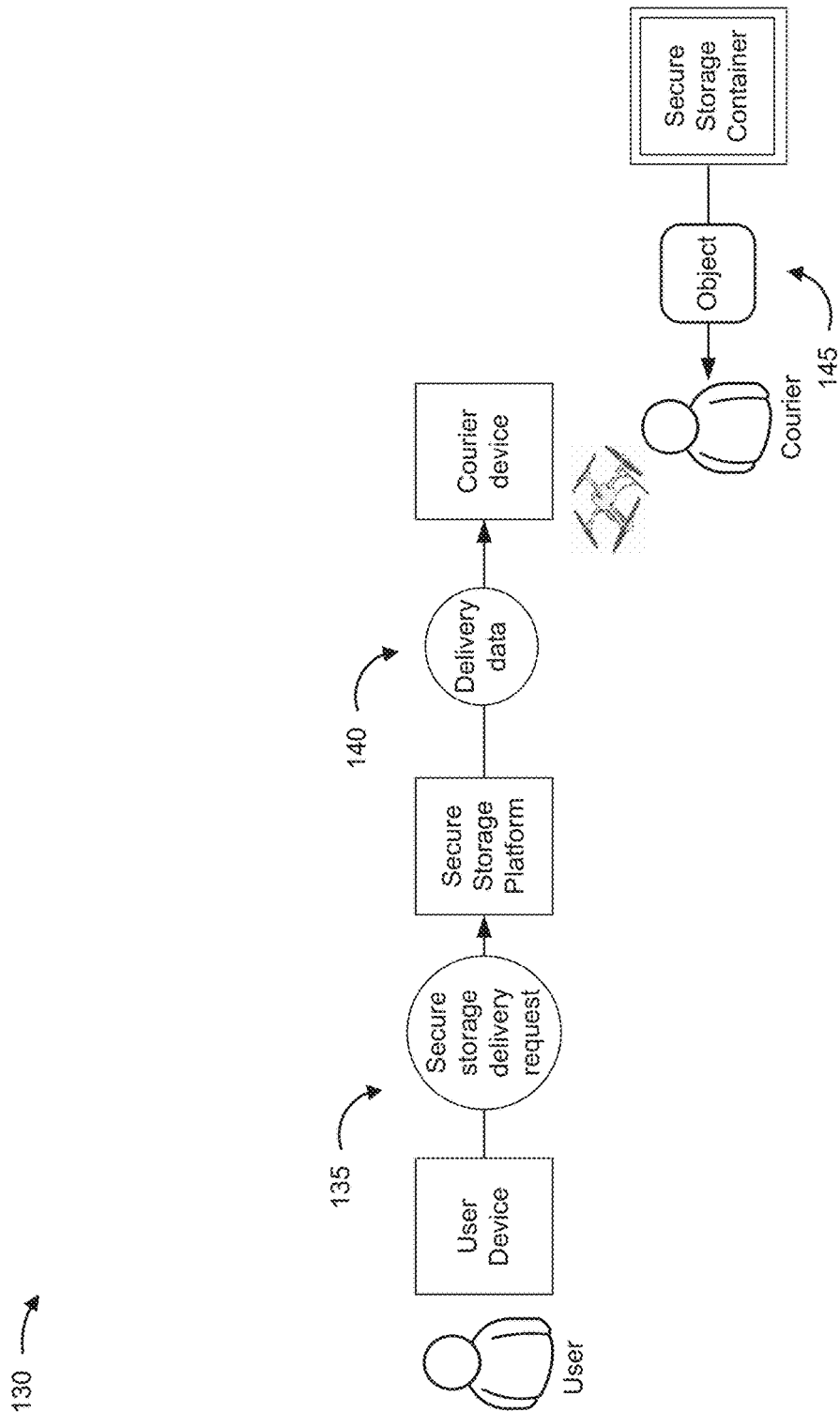

FIG. 1B is a diagram of an overview of an example implementation 130 described herein. As shown in FIG. 1B, example implementation 130 includes a user device, a secure storage platform, a courier device (e.g., a device associated with a courier), and a secure storage container. Example implementation 130 also includes a user and a courier (e.g., an entity, such as an individual or UAV, capable of delivering an object to the user).

As shown by reference number 135, the secure storage platform receives a request for secure storage container delivery from the user device (e.g., operated by a user). For example, the request may be a request to have the secure storage container delivered to the user or a request to have an object from the secure storage container delivered to the user. In some implementations, the secure storage platform may also receive additional information from the user device, such as user account data (e.g., a user account identifier), a delivery location, a delivery time, a delivery method (e.g., human courier, courier organization, UAV courier, land-based autonomous vehicle, a robotic courier, and/or the like), and/or the like. The request may be received in a variety of ways, e.g., through a user interface provided by the secure storage platform, through a web page provided by the secure storage platform, through an application operating on the user device, through a phone call placed by the user device, and/or the like.

The secure storage platform may identify a courier and/or a corresponding courier device in a variety of ways. In some implementations, data identifying a courier or couriers may be included in the delivery request, and the secure storage platform may select a courier from the courier(s) included in the request (e.g., in a user defined order, randomly, or based on various criteria such as price, delivery time, courier quality ratings, and/or the like). In some implementations, the secure storage platform may use a courier service (e.g., a third party delivery service) to identify a courier (e.g., by submitting a request to the courier service). In some implementations, the secure storage platform may have access to information identifying available couriers, including available UAVs, land-based autonomous vehicles, robotic couriers, or human couriers, from which the secure storage platform may select a courier (e.g., based on a predetermined order, user preferences, courier price, estimated delivery time, courier quality ratings, and/or the like).

As shown by reference number 140, the secure storage platform provides delivery data to the courier device. As noted above, the courier device is a device associated with a courier, and the type of device may depend on the courier. For example, for a human courier, the courier device may be use a smart phone, tablet computer, personal computer, and/or the like. In an implementation where a UAV is used as a courier, the courier device may be the UAV (e.g., a computing device included in the UAV). As another example, the courier device may be a computing device designed to communicate delivery instructions to couriers, such as a server device operating a courier dispatch application (e.g., for dispatching human and/or UAV couriers).

The delivery data provided to the courier device may include a variety of information. For example, the delivery data may include a pick-up location (e.g., a location of the secure storage container), a delivery location, a delivery path from the pick-up location to the delivery location, a delivery time, traffic information (e.g., for a route to the pick-up location, delivery location, and/or the like), information identifying a user at the delivery location (e.g., a photograph of the user, name of the user, description of the user, and/or the like), information identifying a type of authentication that is to be provided by the user at the delivery location (e.g., biometric authentication, a driver license, a signature, and/or the like), information identifying a quantity of authentications required for delivery (e.g., a quantity of biometric authentications, such as a voice authentication and a fingerprint authentication), compensation information (e.g., an amount offered for performing the delivery), data identifying the secure storage container (e.g., an identifier, user name associated with the secure storage container, and/or the like), data identifying one or more objects to be retrieved from the secure storage container, and/or the like.

In some implementations, the secure storage platform may provide the delivery data to the courier device based on user account settings associated with the user. For example, in a situation where the secure storage platform receives the delivery request from a user device associated with a user account that is not the user account associated with the secure storage container (e.g., in a situation where the delivery request is provided by a user who is not the owner of the secure storage container), the secure storage platform may check user access control data associated with the secure storage container, in a manner designed to ensure that the user requesting delivery is authorized to request delivery. As another example, user account settings for a secure storage container may indicate a particular courier, set of couriers, type of courier, and/or the like, which are authorized to deliver objects and/or the secure storage container itself.

In some implementations, the secure storage platform may temporarily grant access to the secure storage container for the courier that will be making the delivery. For example, a human courier may be temporarily added to an access control list associated with a secure storage container, enabling the courier to access the secure storage container for the purpose of making the requested delivery.

As shown by reference number 145, the courier (e.g., the courier associated with the courier device), obtains the requested object from the secure storage container. As noted above, in some implementations, the courier may be a person (e.g., obtaining the object from the secure storage container by traveling to the secure storage container location). In an implementation where the courier is a UAV, land-based autonomous vehicle, robotic courier, or another non-human delivery device, the courier may be co-located with the secure storage container (e.g., both may be located at a bank or other location for storing secure storage containers), or the courier may be remote from the secure storage container (e.g., a UAV may be dispatched from a remote location to obtain the object from the secure storage container by traveling to the secure storage container location).

In some implementations, the request may be associated with a request to have an object picked up from the user and placed in the secure storage container, e.g., in a manner designed to enable the user to have a courier pick up the object and take the object to the secure storage container for storage on behalf of the user. In this situation, rather than obtaining an object from the secure storage container (as depicted by reference number 145), the courier may be dispatched to the user without an object. As described in further detail, below, the courier may obtain an object from the user and deliver the object to the secure storage container.

In some implementations, when the courier obtains the object from the secure storage container, a camera device may be used to capture an image of the secure storage container contents (e.g., before, during, and/or after the object is removed from the secure storage container). The captured image may be provided to the secure storage platform and included in the data structure used to store images and other information regarding the secure storage container, (e.g., in a manner similar to that described above, with respect to implementation 100 of FIG. 1A).

In this way, the secure storage platform may receive a request for a delivery associated with the secure storage container, enabling the secure storage platform to provide delivery information to a courier device, facilitating delivery of the secure storage container (or an object included in the secure storage container) to the user.

Figure 1C:
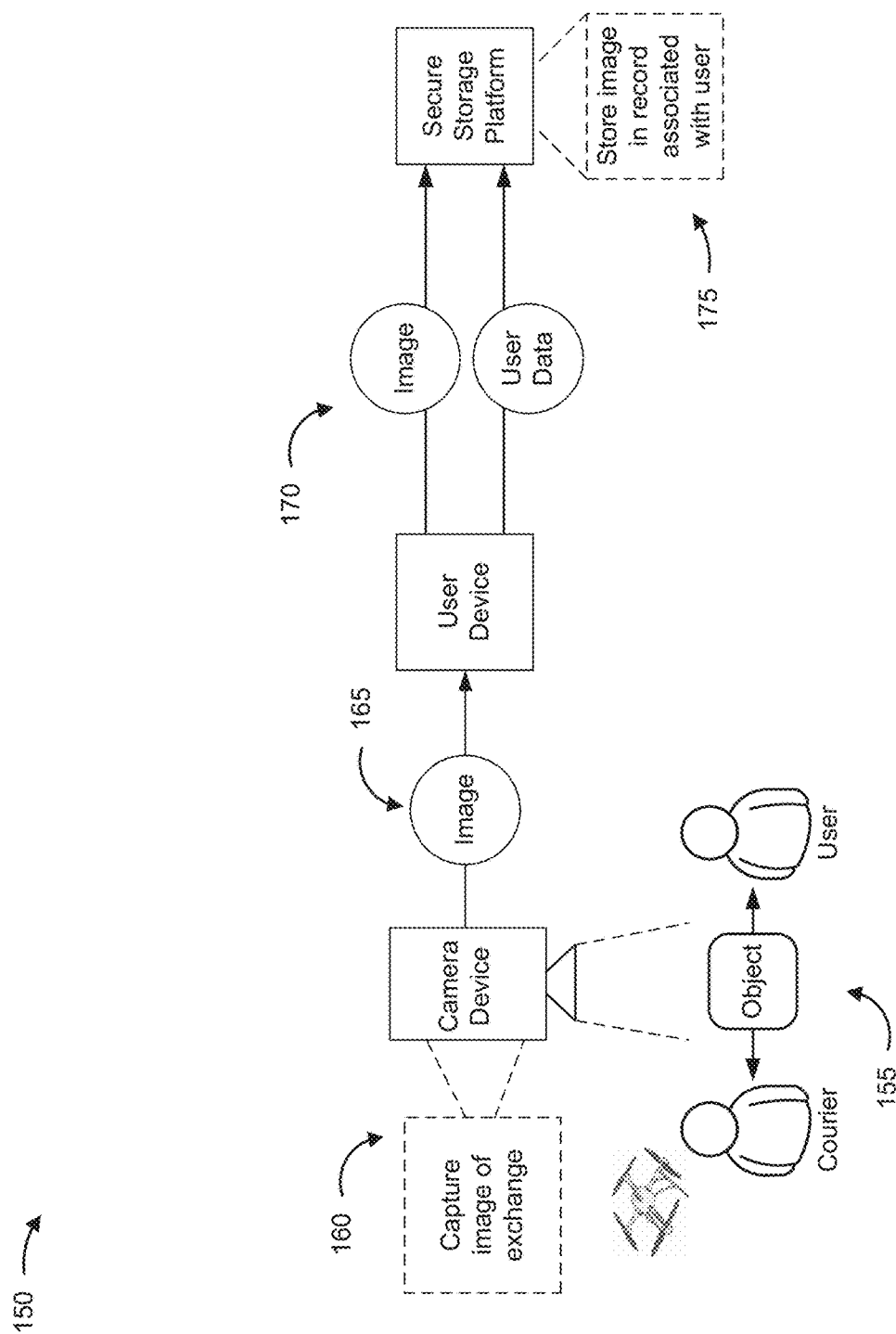

FIG. 1C is a diagram of an overview of an example implementation 150 described herein. As shown in FIG. 1C, example implementation 150 includes a camera device, a user device and a secure storage platform. Example implementation 150 also includes a courier and a user.

As shown by reference number 155, the user obtains an object from the courier and/or provides an object to the courier. The exchange of the object may occur, for example, based on the request sent by the user (e.g., with reference to implementation 130 of FIG. 1B). By way of example, the user may have sent a request indicating that a particular object should be delivered to the user by a courier and, after the courier obtains the object from the secure storage container associated with the user, the courier may then provide the object to the user (e.g., at a remote location.). In some implementations, the courier may take the secure storage container to the user based on the request, enabling the user to add and/or remove an object (or objects) from the secure storage container while at a remote location. In some implementations, the courier may be dispatched to the user without an object or the secure storage container, e.g., in a manner designed to enable the user to provide the courier with an object, which the courier will then deliver to the secure storage container.

In some implementations, the secure storage platform may facilitate the performance of user authentication for the exchange between the courier and the user. For example, the secure storage platform may provide user authentication data to a courier device associated with the courier. The user authentication data may be in a variety of forms. For example, the user authentication data may be an image of the user (e.g., to enable the courier to verify that the user involved in the exchange is the user associated with the request), application instructions that enable a courier device associated with the courier to receive user input from the user and transmit that input to the secure storage platform for verification (e.g., instructions that cause an application operating on the courier device to present user input fields for accepting user input, such as a password for user verification, an image for facial recognition, a fingerprint for biometric identification, a voice recording for vocal recognition, and/or the like). In this situation, the secure storage platform may receive the user input and use the user input to authenticate the user, providing the courier (e.g., via the courier device) with assurance that the user that provided user input is the user to which the courier is to deliver the object and/or secure storage container. In some implementations, the type of authentication may be predetermined, based on user settings, based on default secure storage platform settings, based on information included in the request (e.g., the user may specify the type of authentication to be used for the delivery), and/or the like.

In some implementations, the secure storage platform may provide the user device with information that can be used to track the courier. For example, the user device may operate an application associated with the secure storage platform, and the secure storage platform may provide the user device with data that causes the application to display a map indicating a position of the courier, an estimated time of delivery, an estimated time of pickup, and/or the like. In some implementations, courier tracking data may also be stored, by the secure storage platform, in a record associated with the secure storage container, e.g., in a manner designed to physically track the location of a secure storage container and/or an object associated with a secure storage container while it is being transferred by a courier.

As shown by reference number 160, a camera device captures an image of the exchange between the user and the courier (e.g., the exchange of the object and/or the secure storage container). The image may be captured in a variety of ways (e.g., similar to the manner in which image capture occurs as described in FIG. 1A, above) including, for example, being captured by a camera device included in the user device, the courier device, the secure storage container, and/or the like. In some implementations, multiple images of the exchange may be captured. For example, the camera device may capture an image before, during, and after the exchange, in a manner designed to capture the entire exchange process. As shown by reference number 165, the image is provided to the user device. The image may be provided to the user device in a variety of ways (e.g., similar to the manner in which the image is provided to the user device as described in FIG. 1A, above). For example, the camera device may be included in or otherwise in communication with the user device. Additionally, or alternatively, the image may be provided to a courier device, e.g., in a manner designed to enable the courier device to provide the image of the exchange to the secure storage platform.

As shown by reference number 170, the user device provides the image of the exchange to the secure storage platform. In the example implementations 150, the user device also provides user data to the secure storage platform. The user data provided to the secure storage platform may include information similar to the user data described in FIG. 1A. For example, the user data may include a user account identifier that identifies a user account associated with the secure storage container, user input regarding the addition or removal of the object from the secure storage container, data identifying the object that was added or removed, and/or the like.

As shown by reference number 175, the secure storage platform stores the received image in a record associated with the user (e.g., in a record associated with the secure storage container that is associated with the user). The image may be stored in the record in a manner similar to that described above, with reference to FIG. 1A. For example, the secure storage platform may store information such as: time stamped records indicating when the secure storage container was accessed, data identifying the object that was added or removed when the secure storage container was accessed, images of the secure storage container contents and/or the exchange, data identifying which user accessed the secure storage container or received an object or provided an object, data identifying a courier that delivered an object and/or the secure storage container, and/or the like.

In some implementations, after the exchange between the courier and the user, at least one additional action may occur. For example, after an object has been delivered from the secure storage container, the secure storage platform may send confirmation information to the user associated with the secure storage container (e.g., confirmation information, such as information identifying the user to which the object was delivered, information identifying the object that was delivered, information identifying the contents of the secure storage container, and/or the like). In a situation where the courier took the secure storage container to the user, the courier may return the secure storage container to its storage location. In this situation, the secure storage platform may obtain an image and other information regarding the return of the secure storage container and store the information in a record associated with the secure storage container (e.g., in a manner similar to the secure storage container access described with respect to implementation 100 of FIG. 1A). In a situation where the courier obtained an object from the user for placement in the secure storage container, the courier may return to the storage location of the secure storage container with the object, to place the object in the secure storage container. In this situation, the secure storage platform may obtain an image and other information regarding the placement of the object in the secure storage container and store the information in a record associated with the secure storage container (e.g., in a manner similar to the secure storage container access described with respect to implementation 100 of FIG. 1A).

In some implementations, the secure storage platform may take a variety of actions, including providing one or more other devices with a variety of different types of data related to secure storage containers. For example, the secure storage platform may provide information regarding a secure storage container by hosting a web site, providing electronic mail, hosting an application server, providing smart phone notifications, and/or the like. The information provided by the secure storage platform may make any of the data stored for one or more secure storage containers available to users with access to the data, such as the user associated with the secure storage container and/or other users given access to information regarding the secure storage container (e.g., via access control data provided by the user). By way of example, the secure storage platform may host a web site that provides a user device with data that causes the user device to display records of access to a secure storage container, including images, timestamps, user data, and/or the like. As another example, the secure storage platform may send an electronic mail message, smart phone notification, and/or the like, which may include information stored in records associated with a secure storage container. In a situation where the secure storage platform operates as an application server, the secure storage platform may provide a user device with information stored in records associated with a secure storage container in a form that can be displayed by an application operating on the user device.

In some implementations, the secure storage platform may take action (e.g., provide information regarding a secure storage platform) based on the occurrence of an event. For example, the secure storage platform may provide information regarding a secure storage container based on receiving a request from a user device (e.g., a user device that is associated with a user account authorized to access the information). As another example, the secure storage platform may periodically provide information regarding a secure storage container (e.g., to user devices associated with user accounts that have opted in to receiving periodic updates regarding the secure storage container). As yet another example, the secure storage platform may provide information regarding the secure storage container based on access to the secure storage container (e.g., based on a secure storage container being accessed, the secure storage platform may provide information regarding the access to a user device associated with a user account that has opted in to receiving secure storage container information whenever the secure storage container is accessed).

While a variety of example actions are described above as being performed by the secure storage platform, other actions may also be taken by the secure storage platform in a manner designed to facilitate the virtual and physical management of secure storage containers. In this way, the secure storage platform enables physical and/or virtual access to a secure storage container, providing a remote user with the ability to add or remove objects from the secure storage container without traveling to a physical location where the secure storage container may typically be stored (e.g., a bank vault). In some situations, this may provide users with access to their secure storage containers in situations where access might otherwise be difficult, or impracticable. In addition, the secure storage platform enables a user to allow other users to access (physically and/or virtually) a secure storage container associated with the user, allowing the user to share access to the secure storage container (e.g., as defined by access controls set by the user). Furthermore, by using a data structure to store information regarding secure storage container access, the secure storage platform may provide an enhanced user experience for a user, enabling a user to view images of the contents of the secure storage container, and other information regarding secure storage container access, at various points in time and/or associated with various events, such as the removal or addition of an object.

As indicated above, FIGS. 1A-1C are provided merely as examples. Other examples are possible and may differ from what was described with regard to FIGS. 1A-1C.

Figure 2:
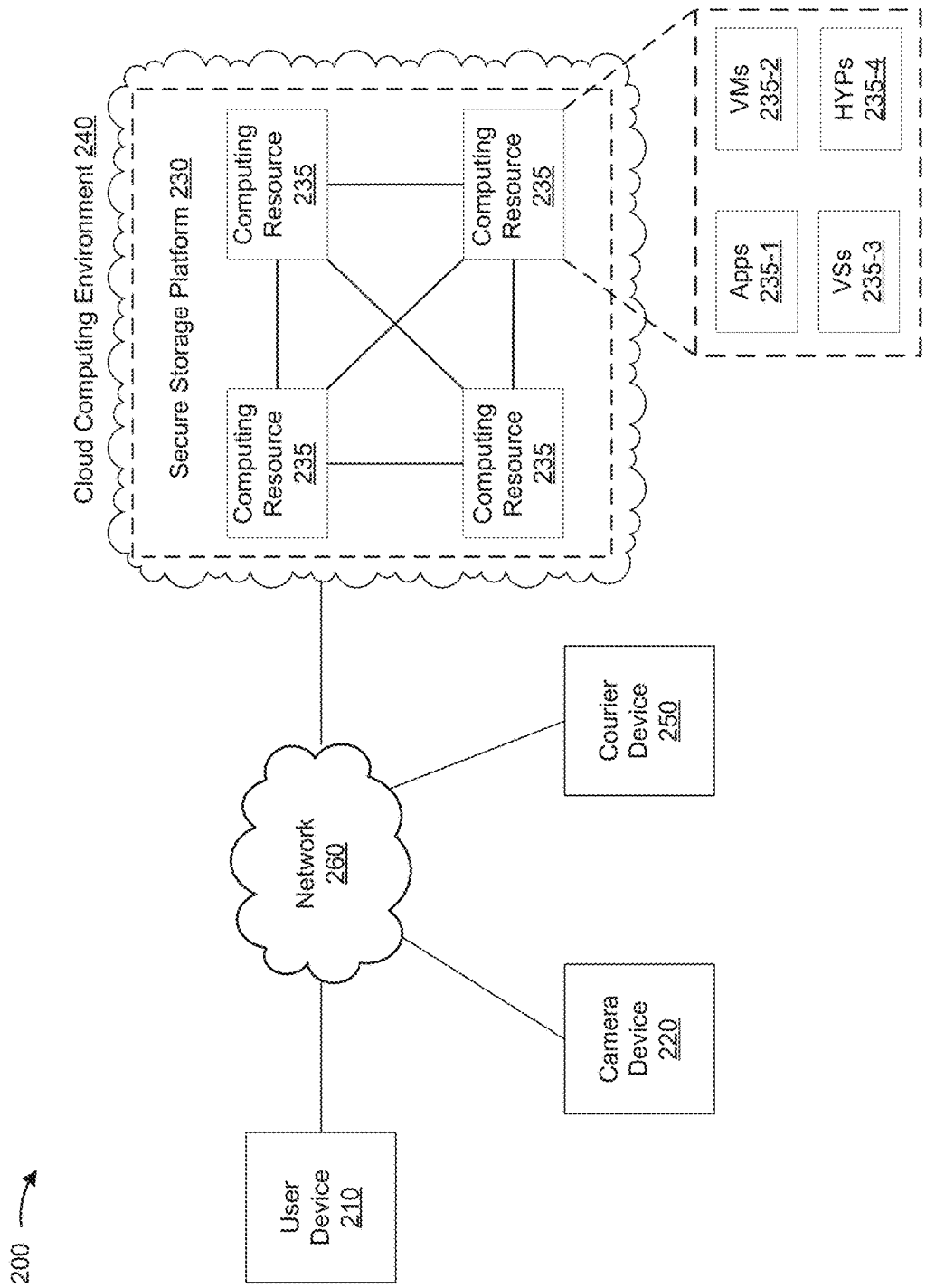
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a camera device 220, a secure storage platform 230, computing resources 235, a cloud computing environment 240, a courier device 250, and a network 260. Devices of environment 200 may interconnect via wired connections, wireless connections, or a combination of wired and wireless connections.

User device 210 includes one or more devices capable of receiving, generating, storing, processing, and/or providing information associated with images and secure storage containers. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may include hardware, or a combination of hardware and software, that enables user device 210 to communicate with camera device 220 and/or secure storage platform 230 to transmit and/or receive images and/or other data associated with a secure storage container. For example, user device 210 may include a web browser application designed to enable user device 210 to view records associated with access to a secure storage container.

Camera device 220 includes one or more devices capable of receiving, generating, storing, processing, and/or providing information associated with one or more images (e.g., photographs), video, and/or audio. For example, camera device 220 may include a digital still camera, analog still camera, digital video camera, analog video camera, a microphone, or a communication and/or computing device in communication with a camera, such as a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), a server device, a group of server devices, a cloud computing device, a data center device, or a similar type of device. Camera device 220 may include hardware, or a combination of hardware and software, that enables camera device 220 to capture an image and/or video and transmit the captured image and/or video to another device or devices, such as user device 210, courier device 250, and/or secure storage platform 230. In some implementations, camera device 220 may be fixed to a particular location (e.g., at a place of business, inside a secure storage container, and/or the like), and in some implementations, camera device 220 may be included in another device, such as user device 210 or courier device 250. In some implementations, the data captured by camera device 220 may include other data enabling identification of objects, such as matrix bar code capture data, bar code reader data, optical character recognition capture data, and/or the like (e.g., enabling camera device 220 to be capable of scanning a document or object bar code for identifying objects).

Secure storage platform 230 includes one or more devices capable of receiving, generating, storing, processing, and/or providing information associated with images, video, user data, and secure storage containers. For example, secure storage platform 230 may include a server device (e.g., a host server, a web server, an application server, etc.), a data center device, or a similar device. For example, secure storage platform 230 may be capable of receiving images, video, user data, secure storage container access information, and/or the like, from user device 210, camera device 220, or courier device 250. Secure storage platform 230 may be capable of storing images, video, user data, secure storage container access information, and/or the like, in data structures, such as records stored in a database. In addition, secure storage platform 230 may be capable of providing images, video, user data, secure storage container access information, and/or the like, to one or more devices, such as user device 210, in a manner designed to enable the one or more devices to be able to view or otherwise consume the images, video, user data, secure storage container access information, and/or the like.

In some implementations, as shown, secure storage platform 230 may be hosted in cloud computing environment 240. Notably, while implementations described herein describe secure storage platform 230 as being hosted in cloud computing environment 240, in some implementations, secure storage platform 230 might not be cloud-based (i.e., may be implemented outside of a cloud computing environment) or might be partially cloud-based.

Cloud computing environment 240 includes an environment that delivers computing as a service, whereby shared resources, services, etc. may be provided to secure storage platform 230, e.g., to facilitate physical and/or virtual access to secure storage containers. Cloud computing environment 240 may provide computation, software, data access, storage, and/or other services that do not require end-user knowledge of a physical location and configuration of a system and/or a device that delivers the services. As shown, cloud computing environment 240 may include secure storage platform 230 and computing resources 235.

Computing resource 235 includes one or more personal computers, workstation computers, server devices, or another type of computation and/or communication device. In some implementations, computing resource 235 may host secure storage platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with secure storage platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Courier device 250 includes one or more devices capable of receiving, generating, storing, processing, and/or providing information associated with images and secure storage containers. For example, courier device 250 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, courier device 250 may be, or may be included in, an electro-mechanical delivery device, such as a UAV (e.g., a delivery "drone"), land-based autonomous vehicle, a robotic courier, or similar type of delivery device. Courier device 250 may include hardware, or a combination of hardware and software, that enables courier device 250 to communicate with camera device 220 and/or secure storage platform 230 to transmit and/or receive images and/or other data associated with a secure storage container.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
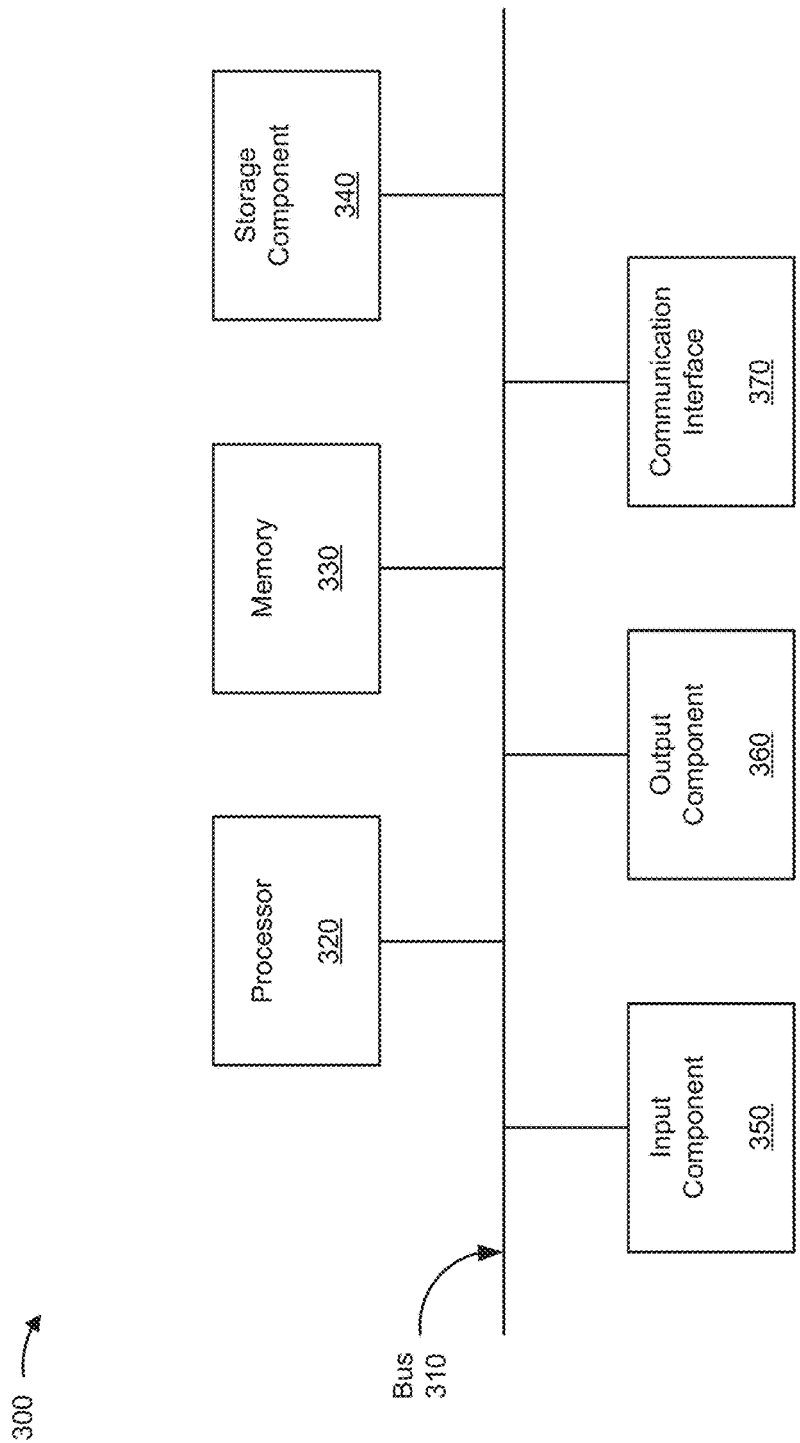
FIG. 3 is a diagram of example components of one or more devices of FIG. 2.

FIG. 3 is a diagram of example components of a device 300. Device 300 may correspond to user device 210, camera device 220, secure storage platform 230, computing resource 235, and/or courier device 250. In some implementations, user device 210, camera device 220, secure storage platform 230, computing resource 235, and/or courier device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
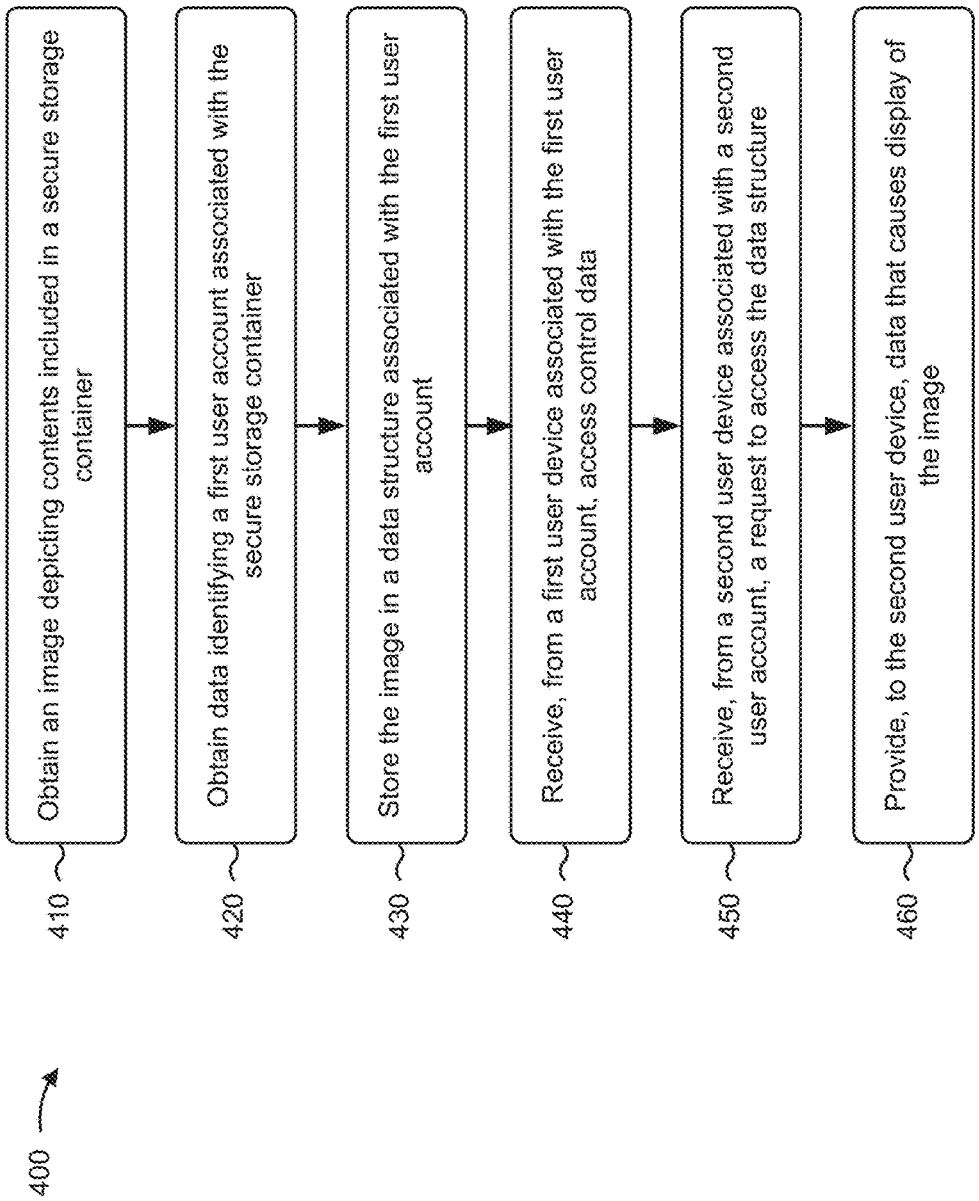
FIG. 4 is a flow chart of an example process for providing virtual access to a secure storage container.

FIG. 4 is a flow chart of an example process 400 for providing virtual access to a secure storage container. In some implementations, one or more process blocks of FIG. 4 may be performed by secure storage platform 230. In some implementations, one or more process blocks of FIG. 4 may be performed by another device or a group of devices separate from or including secure storage platform 230, such as user device 210, camera device 220, computing resource 235, and/or courier device 250.

As shown in FIG. 4, process 400 may include obtaining an image depicting contents included in a secure storage container (block 410). For example, secure storage platform 230 may (e.g., using processor 320, input component 350, and/or communications interface 370) obtain, from user device 21, camera device 220, and/or courier device 250, an image depicting contents included in a secure storage container, as described above in connection with FIGS. 1A-1C.

As further shown in FIG. 4, process 400 may include obtaining data identifying a first user account associated with the secure storage container (block 420). For example, secure storage platform 230 may (e.g., using processor 320, input component 350, and/or communications interface 370) obtain, from user device 210 and/or courier device 250, data identifying a user account associated with the secure storage container, as described above in connection with FIGS. 1A-1C.

As further shown in FIG. 4, process 400 may include storing the image in a data structure associated with the first user account (block 430). For example, secure storage platform 230 may (e.g., using processor 320, memory 330, storage component 340, output component 360, and/or communications interface 370) store the image in a data structure associated with the first user account, as described above in connection with FIGS. 1A-1C.

As further shown in FIG. 4, process 400 may include receiving, from a first user device associated with the first user account, access control data, the access control data indicating that access to the data structure is permitted for requests associated with a second user account (block 440). For example, secure storage platform 230 may (e.g., using processor 320, input component 350, and/or communications interface 370) receive, from a first user device 210 associated with the first user account, access control data indicating that access to the data structure is permitted for requests (e.g., for physical and/or virtual access to the secure storage container) associated with a second user account, as described above in connection with FIGS. 1A-1C.

As further shown in FIG. 4, process 400 may include receiving, from a second user device associated with the second user account, a request to access the data structure (block 450). For example, secure storage platform 230 may (e.g., using processor 320, input component 350, and/or communications interface 370) receive, from a second user device 210 associated with the second user account, a request to access the data structure (e.g., the data structure used to store the image depicting the contents included in the secure storage container), as described above in connection with FIGS. 1A-1C.

As further shown in FIG. 4, process 400 may include providing, to the second user device, data that causes display of the image (block 460). For example, secure storage platform 230 may (e.g., using processor 320, memory 330, storage component 340, output component 360, and/or communications interface 370) provide, to the second user device 210, data that causes display of the image (e.g., in a web browsing application, secure storage container application, and/or the like), as described above in connection with FIGS. 1A-1C.

Process 400 may include additional implementations, such as any single implementation or any combination of implementations described below.

In some implementations, secure storage platform 230 may obtain the image from a camera device 220 after an object was added to the secure storage container, and the camera device 220 may have captured the image based on the object being added to the secure storage container.

In some implementations, secure storage platform 230 may obtain the image from a camera device 220 after an object was removed from the secure storage container, the camera device 220 having captured the image based on the object being removed from the secure storage container.

In some implementations, secure storage platform 230 may obtain the image from a camera device 220 identified as being collocated with the secure storage container, the camera device 220 having captured the image based on the object being added to or removed from the secure storage container.

In some implementations, secure storage platform 230 may obtain the image from a camera device 220 associated with the first user device 210.

In some implementations, the access control data further indicates that physical access to the secure storage container is permitted for an individual associated with second user account data.

In some implementations, secure storage platform 230 may store, in the data structure associated with the first user account, an action associated with the contents of the secure storage container. Secure storage platform 230 may store, in the data structure associated with the first user account, a timestamp associated with the action, and provide, to the second user device 210, data that causes display of the action and the timestamp.

Figure 5:
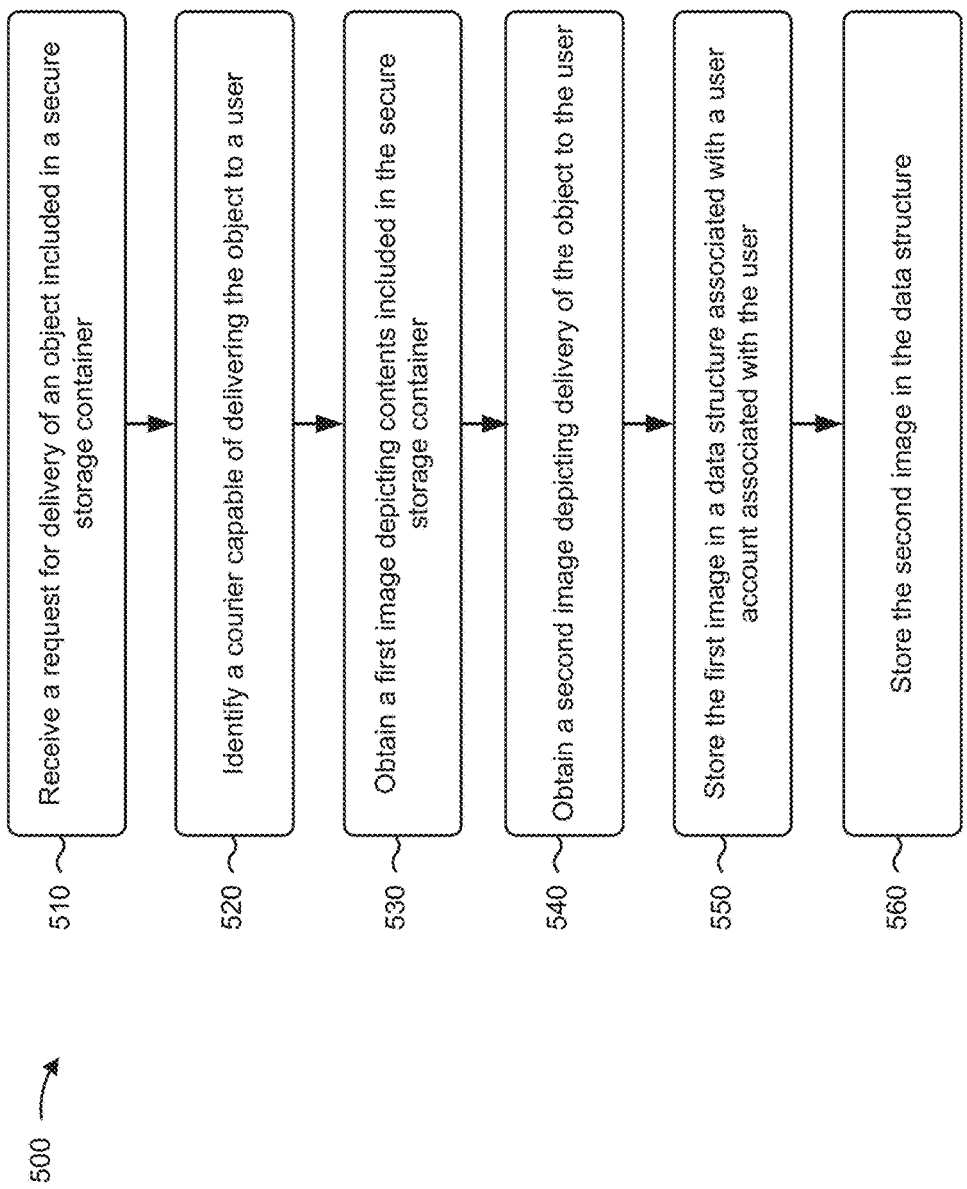
FIG. 5 is a flow chart of an example process for providing physical access to a secure storage container.

FIG. 5 is a flow chart of an example process 500 for providing physical access to a secure storage container. In some implementations, one or more process blocks of FIG. 5 may be performed by secure storage platform 230. In some implementations, one or more process blocks of FIG. 5 may be performed by another device or a group of devices separate from or including secure storage platform 230, such as user device 210, camera device 220, computing resource 235, and/or courier device 250.

As shown in FIG. 5, process 500 may include receiving a request for delivery of an object included in a secure storage container, the request being associated with a user account associated with a user (block 510). For example, secure storage platform 230 may (e.g., using processor 320, input component 350, and/or communications interface 370) receive a request for delivery of an object included in a secure storage container, the request being associated with a user account associated with a user, as described above in connection with FIGS. 1A-1C.

As further shown in FIG. 5, process 500 may include identifying a courier capable of delivering the object to the user (block 520). For example, secure storage platform 230 may (e.g., using processor 320, memory 330, storage component 340, output component 360, and/or communications interface 370) identify a courier capable of delivering the object to the user, as described above in connection with FIGS. 1A-1C.

As further shown in FIG. 5, process 500 may include obtaining a first image depicting contents included in the secure storage container, the first image being captured based on the courier obtaining the object from the secure storage container (block 530). For example, secure storage platform 230 may (e.g., using processor 320, input component 350, and/or communications interface 370) obtain a first image depicting contents included in the secure storage container, the first image being captured based on the courier obtaining the object from the secure storage container, as described above in connection with FIGS. 1A-1C.

As further shown in FIG. 5, process 500 may include obtaining a second image depicting delivery of the object to the user (block 540). For example, secure storage platform 230 may (e.g., using processor 320, input component 350, and/or communications interface 370) obtain a second image depicting delivery of the object to the user, as described above in connection with FIGS. 1A-1C.

As further shown in FIG. 5, process 500 may include storing the first image in a data structure associated with the user account (block 550). For example, secure storage platform 230 may (e.g., using processor 320, memory 330, storage component 340, output component 360, and/or communications interface 370) store the first image in a data structure associated with the user account, as described above in connection with FIGS. 1A-1C.

As further shown in FIG. 5, process 500 may include storing the second image in the data structure (block 560). For example, secure storage platform 230 may (e.g., using processor 320, memory 330, storage component 340, output component 360, and/or communications interface 370) store the second image in the data structure, as described above in connection with FIGS. 1A-1C.

Process 500 may include additional implementations, such as any single implementation or any combination of implementations described below.

In some implementations, the courier may be an unmanned aerial vehicle (UAV).

In some implementations, secure storage platform 230 may receive, from a courier device 250 associated with the courier, user authentication data; authenticate the user based on the user authentication data; and provide the courier device 250 with results of authentication.

In some implementations, secure storage platform 230 may provide the courier with delivery instructions, the delivery instructions including: a pick-up location associated with the secure storage container; and a delivery location associated with the user. In some implementations, the delivery instructions include user authentication data that enables the courier to authenticate the user. In some implementations, the delivery instructions cause the courier to deliver the secure storage container to the user. In some implementations, secure storage platform 230 may obtain a third image depicting return of the secure storage container to the pick-up location, and store the third image in the data structure.

In this way, secure storage platform 230 enables physical and/or virtual access to a secure storage container, providing a remote user with the ability to add or remove objects from the secure storage container without traveling to a physical location where the secure storage container may typically be stored (e.g., a bank vault). In some situations, this may provide users with access to their secure storage containers in situations where access might otherwise be difficult, or impracticable. In addition, secure storage platform 230 enables a user to allow other users to access (physically and/or virtually) a secure storage container associated with the user, allowing the user to share access to the secure storage container (e.g., as defined by access controls set by the user). Furthermore, by using a data structure to store information regarding secure storage container access, secure storage platform 230 may provide an enhanced user experience for a user, enabling a user to view images of the contents of the secure storage container, and other information regarding secure storage container access, at various points in time and/or associated with various events, such as the removal or addition of an object.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, a request for delivery of an object included in a secure storage container,
        the request being associated with a user account associated with a user;
    identifying, by the device, a courier capable of delivering the object to the user;
    providing, by the device, delivery instructions to the courier,
        the delivery instructions including:
            a pick-up location associated with the secure storage container, and
            a delivery location associated with the user, and
        the delivery instructions specifying that the courier is to deliver the secure storage container to the delivery location;
    obtaining, by the device, a first image depicting contents included in the secure storage container,
        the first image being captured based on the courier obtaining the secure storage container;
    obtaining, by the device, a second image depicting delivery of the object to the user;
    storing, by the device, the first image in a data structure associated with the user account;
    storing, by the device, the second image in the data structure;
    obtaining, by the device, a third image depicting return of the secure storage container to the pick-up location; and
    storing, by the device, the third image in the data structure.

2. The method of claim 1, wherein the courier is an unmanned aerial vehicle (UAV).

3. The method of claim 1, further comprising:
    receiving, from a courier device associated with the courier, user authentication data;
    authenticating the user based on the user authentication data; and
    providing the courier device with results of authentication.

4. The method of claim 3, wherein the user authentication data includes a fourth image,
    the fourth image depicting a face of the user.

5. The method of claim 3, wherein the user authentication data includes biometric information associated with the user.

6. The method of claim 1, wherein the delivery instructions further include user authentication data that enables the courier to authenticate the user.

7. The method of claim 1, wherein:
    the courier is an unmanned aerial vehicle (UAV); and
    the delivery instructions cause the courier to deliver the secure storage container to the user.

8. A device, comprising:
    one or more memories; and
    one or more processors, communicatively coupled to the one or more memories, configured to:
        receive a request for delivery of an object included in a secure storage container,
            the request being associated with a user account associated with a user;
        identify a courier capable of delivering the object to the user;
        provide the courier with delivery instructions,
            the delivery instructions including:
                a pick-up location associated with the secure storage container, and
                a delivery location associated with the user, and
            the delivery instructions specifying that the courier is to deliver the secure storage container to the delivery location;
        obtain a first image depicting contents included in the secure storage container,
            the first image being captured based on the courier obtaining the secure storage container;
        obtain a second image depicting delivery of the object to the user;
        store the first image in a data structure associated with the user account;
        store the second image in the data structure;
        obtain a third image depicting return of the secure storage container to the pick-up location; and
        store the third image in the data structure.

9. The device of claim 8, wherein the courier is an unmanned aerial vehicle (UAV).

10. The device of claim 8, wherein the one or more processors are further configured to:
    receive, from a courier device associated with the courier, user authentication data;
    authenticate the user based on the user authentication data; and
    provide the courier device with results of authentication.

11. The device of claim 10, wherein the user authentication data includes a user password.

12. The device of claim 8, wherein the delivery instructions further include user authentication data that enables the courier to authenticate the user.

13. The device of claim 8, wherein:
the courier is an unmanned aerial vehicle (UAV); and
the delivery instructions cause the courier to deliver the secure storage container to the user.

14. The device of claim 8, wherein the first image, the second image, and the third image were captured by a camera device included in the secure storage container.

15. A non-transitory computer-readable medium storing instructions, the instructions comprising:
one or more instructions that, when executed by one or more processors, cause the one or more processors to:
receive a request for delivery of an object included in a secure storage container,
the request being associated with a user account associated with a user;
identify a courier capable of delivering the object to the user;
provide the courier with delivery instructions,
the delivery instructions including:
a pick-up location associated with the secure storage container, and
a delivery location associated with the user, and
the delivery instructions specifying that the courier is to deliver the secure storage container to the delivery location;
obtain a first image depicting contents included in the secure storage container,
the first image being captured based on the courier obtaining the secure storage container;
obtain a second image depicting delivery of the object to the user;
store the first image in a data structure associated with the user account;
store the second image in the data structure;
obtain a third image depicting return of the secure storage container to the pick-up location; and
store the third image in the data structure.

16. The non-transitory computer-readable medium of claim 15, wherein the courier is an unmanned aerial vehicle (UAV).

17. The non-transitory computer-readable medium of claim 15, wherein the one or more instructions, when executed by the one or more processors, further cause the one or more processors to:
receive, from a courier device associated with the courier, user authentication data;
authenticate the user based on the user authentication data; and
provide the courier device with results of authentication.

18. The non-transitory computer-readable medium of claim 15, wherein:
the courier is an unmanned aerial vehicle (UAV); and
the delivery instructions cause the courier to deliver the secure storage container to the user.

19. The non-transitory computer-readable medium of claim 15, wherein the delivery instructions further include user authentication data that enables the courier to authenticate the user.

20. The non-transitory computer-readable medium of claim 19, wherein the user authentication data comprises an image of the user.

* * * * *